(12) United States Patent
Chaney

(10) Patent No.: US 12,356,906 B2
(45) Date of Patent: Jul. 15, 2025

(54) HYDROPONIC HIGH DENSITY GROW BOARD FOR DEEP WATER CULTURE

(71) Applicant: BRIGHTFARMS, INC., Irvington, NY (US)

(72) Inventor: Nicholas Alexander Chaney, Clarksville, OH (US)

(73) Assignee: BRIGHTFARMS, INC., Irvington, NY (US)

( * ) Notice: Subject to any disclaimer, the term of this patent is extended or adjusted under 35 U.S.C. 154(b) by 0 days.

(21) Appl. No.: 17/209,709

(22) Filed: Mar. 23, 2021

(65) Prior Publication Data

US 2021/0289725 A1    Sep. 23, 2021

Related U.S. Application Data

(60) Provisional application No. 62/993,252, filed on Mar. 23, 2020.

(51) Int. Cl.
*A01G 31/04* (2006.01)
*A01C 7/00* (2006.01)

(52) U.S. Cl.
CPC ............ *A01G 31/042* (2013.01); *A01C 7/002* (2013.01)

(58) Field of Classification Search
CPC ..... A01G 31/02; A01G 31/024; A01G 31/042
See application file for complete search history.

(56) References Cited

U.S. PATENT DOCUMENTS

| | | | |
|---|---|---|---|
| 5,261,185 A * | 11/1993 | Koide ................... | A01G 31/02 47/65 |
| 6,751,903 B2 * | 6/2004 | Shryock .................. | A01G 9/00 47/85 |
| D580,789 S * | 11/2008 | Larson ......................... | D9/425 |
| 9,807,950 B2 * | 11/2017 | Day ........................ | A01G 31/02 |
| 10,206,335 B2 * | 2/2019 | Tsonakis ............... | A01G 9/028 |
| 10,785,928 B2 * | 9/2020 | Hawley-Weld ....... | A01G 9/0295 |
| 2004/0025429 A1 * | 2/2004 | Houweling ............ | A01G 9/143 47/58.1 R |

(Continued)

FOREIGN PATENT DOCUMENTS

| | | | | |
|---|---|---|---|---|
| FR | 2956283 A1 * | 8/2011 | ............. | A01G 9/025 |
| WO | WO-9635326 A1 * | 11/1996 | ............. | A01G 31/02 |

(Continued)

OTHER PUBLICATIONS https://www.youtube.com/user/Hydronov (Year: 2010).*
https://hydronov.com/ (Year: 2019).*

*Primary Examiner* — Joshua D Huson
*Assistant Examiner* — Edgar Reyes
(74) *Attorney, Agent, or Firm* — Merchant & Gould P.C.

(57) ABSTRACT

The present disclosure provides a raft design for use in hydroponically growing crop seeds. The raft has a plurality of ribs that have a plurality of furrows between them. Media and crop seeds are placed in the furrows. The ribs have rounded tops so that the media and crop seeds do not get stuck on the top of the rib, but rather fall into the furrows. The raft also has a curved or arched underside, so that when the rafts are stacked on top of one another, air can circulate. The present disclosure also provides a process for filing the raft with growing media, seeding, and/or a topcoat. The furrows of the raft are oriented with respect to a hopper to provide a high efficiency.

14 Claims, 10 Drawing Sheets

(56) References Cited

U.S. PATENT DOCUMENTS

| | | | |
|---|---|---|---|
| 2007/0017153 A1* | 1/2007 | Meyer | A01G 27/04 47/87 |
| 2007/0209277 A1* | 9/2007 | Schuck | A01G 9/00 47/59 R |
| 2008/0120903 A1* | 5/2008 | Fair | A01G 9/0295 47/87 |
| 2015/0173306 A1* | 6/2015 | Torcellini | A01G 9/0295 47/65.5 |
| 2016/0270303 A1* | 9/2016 | Cooley | A01G 9/0295 |
| 2017/0027136 A1* | 2/2017 | Newell | A01K 61/60 |
| 2017/0196176 A1* | 7/2017 | Griffin | A01G 9/249 |
| 2019/0029198 A1* | 1/2019 | Van Wingerden | A01G 9/047 |
| 2020/0045900 A1* | 2/2020 | Ghirlanda | A01G 9/028 |
| 2021/0127598 A1* | 5/2021 | Noordam | A01G 9/0295 |
| 2022/0087121 A1* | 3/2022 | Noordam | A01G 31/02 |

FOREIGN PATENT DOCUMENTS

| | | | | |
|---|---|---|---|---|
| WO | WO-9856236 A1 | * | 12/1998 | A01G 31/02 |
| WO | WO-2019160435 A1 | * | 8/2019 | |

* cited by examiner

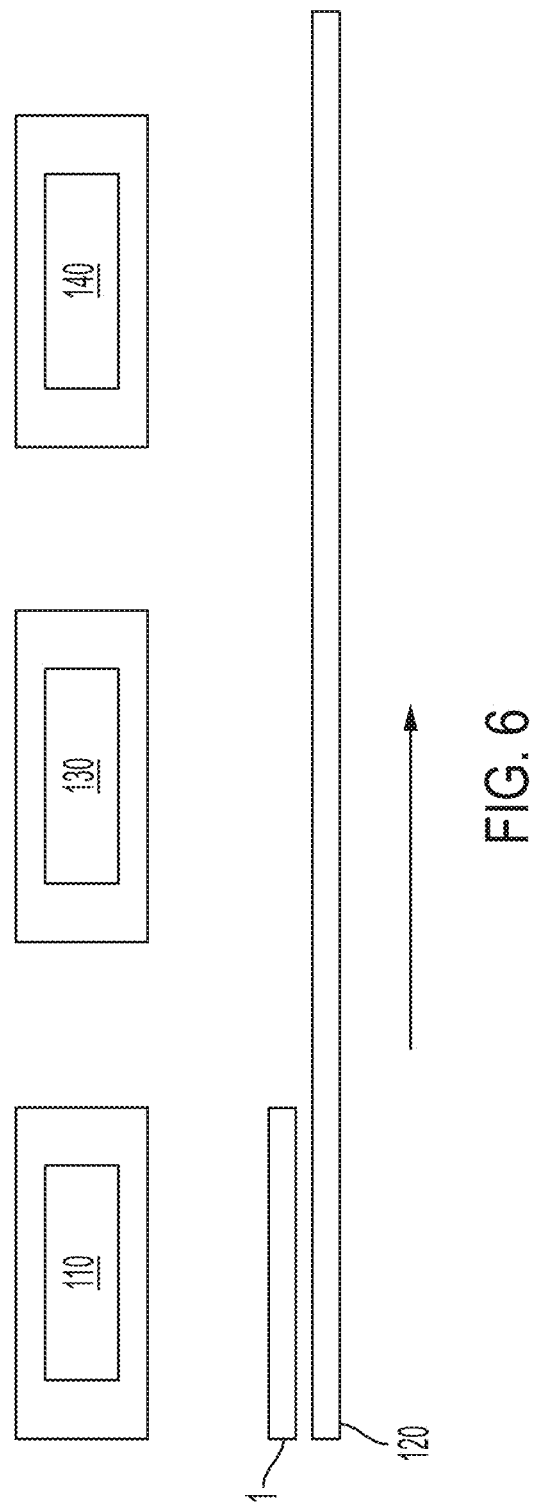

HYDROPONIC HIGH DENSITY GROW BOARD FOR DEEP WATER CULTURE

CROSS-REFERENCE TO RELATED APPLICATION

The present application claims the benefit of U.S. Provisional Patent Application Ser. No. 62/993,252, filed on Mar. 23, 2020 which is incorporated by reference herein.

BACKGROUND OF THE DISCLOSURE

1. Field of the Disclosure

The present disclosure relates to rafts used in deep water culture growing systems to produce crops. More particularly, the present disclosure relates to a raft having ribs with curved tops in between furrows, furrows aligned in one direction, and a concave space on an underside of the raft. Each of these features improves crop yield over currently available rafts.

2. Background of the Related Art

In hydroponic crop growing systems known as deep water culture (DWC), crops are grown by extending their root systems into a bath of water and desired nutrients. The crop is held above the solution on a device known as a raft. The raft may be a board with holes punched in it to hold the crop while its roots dangle in the bath. Many current rafts require that the crops be loaded in manually. Some are automated, where seedlings and the media in which they grow are applied with a machine, but these systems often suffer from loss of material when the seedlings and media do not fall properly into the furrows of the raft for growing.

There is an ongoing need to improve the efficiency and yield of DWC systems, and the rafts used therein.

SUMMARY OF THE DISCLOSURE

The raft of the present disclosure is an array of furrows for crop seeding, where all of the furrows are defined (i.e., surrounded) by ribs. The raft can be passed (for example, on a conveyor or the like) below a hopper, where seedlings and the growing media are applied to the furrows. Advantageously, the raft of the present disclosure has ribs that have concavely shaped top ridges. This allows for the material applied by the hopper to fall into the furrows, as opposed to staying on a top surface of the raft. Further, the furrows are all linear and aligned in rows. This allows the raft to be aligned properly with the hopper to ensure maximum efficiency in operation. Finally, the raft has a concave space underneath. This allows for easier air circulation when the rafts are stacked, which provides improved crop germination.

The present disclosure also provides a method of filling the raft with crop seeds, and media for supporting the crop seeds. The furrows in the raft are substantially linear, and substantially parallel with one another. To fill the raft, it can be passed under a hopper while moving in a direction. The alignment of the furrows is substantially parallel to the direction of movement. This allows for more accurate placement of the media and seeds in the raft. It also allows for customizable placement of the seeds in the media, for example at varying depths.

Accordingly, in one embodiment, the present disclosure provides a raft for growing crops hydroponically, comprising a rectangular frame, a plurality of ribs within and connected to the rectangular frame, and a plurality of furrows, wherein each of the plurality of furrows is defined by the plurality of ribs, such that each furrow is between a pair of adjacent ribs. Each of the plurality of ribs can have a curved surface at a top end.

The present disclosure also provides a method of seeding the above-described raft. The method comprises the steps of moving the raft in a first direction under a hopper, dispersing growing media onto the raft from the hopper, and dispersing crop seeds onto the raft from the hopper. The dispersing the growing media step and the dispersing the crop seeds step can occur before one another, or simultaneously.

In one embodiment, the present disclosure provides a raft for growing crops hydroponically, comprising: a rectangular frame; a plurality of ribs within and connected to the rectangular frame; and a plurality of furrows, wherein each of the plurality of furrows is defined by the plurality of ribs, so that each furrow is between a pair of adjacent ribs. Each of the plurality of ribs can have a curved surface at a top end.

The present disclosure also provides a raft for growing crops hydroponically, comprising: a rectangular frame; a plurality of ribs within and connected to the rectangular frame; and a plurality of furrows, wherein each of the plurality of furrows is defined by the plurality of ribs, such that each furrow is between a pair of adjacent ribs. Each of the furrows are substantially linear, and are in substantially parallel alignment with one another. Each of the plurality of ribs has a curved surface at a top end.

The present disclosure also provides a method of seeding the above-described raft. The method comprises the steps of: moving the raft in a first direction under a hopper; dispersing growing media onto the raft from the hopper; and dispersing crop seeds onto the raft from the hopper. The dispersing the growing media step and the dispersing the crop seeds step can occur before one another, or simultaneously. The hopper disburses the media and the crop seeds along a second direction, wherein the second direction is substantially perpendicular to the first direction.

The present disclosure also includes an assembly for growing crops hydroponically, comprising a raft, a conveyor, a hopper, and optionally, a dibbler. The raft comprises a rectangular frame, a plurality of ribs within and connected to the rectangular frame, and a plurality of furrows. Each of the plurality of furrows is defined by the plurality of ribs, so that each furrow is between a pair of adjacent ribs. Each of the plurality of ribs has a curved surface at a top end. The conveyor moves the raft in a first direction that is parallel to an orientation of the plurality of ribs. The hopper is above the conveyor and disburses growing media and/or crop seeds into the furrow along a second direction. The second direction is substantially perpendicular to the first direction. The dibbler is above the conveyor and comprises a plurality of dibbler wheels. One of the dibbler wheels projects at least partially into an associated furrow, to compact the growing media and/or crop seeds therein.

BRIEF DESCRIPTION OF THE DRAWINGS

FIG. 6 is a schematic drawing of the process for filling the rafts of the present disclosure.

DETAILED DESCRIPTION OF THE DISCLOSURE

Figure 1:
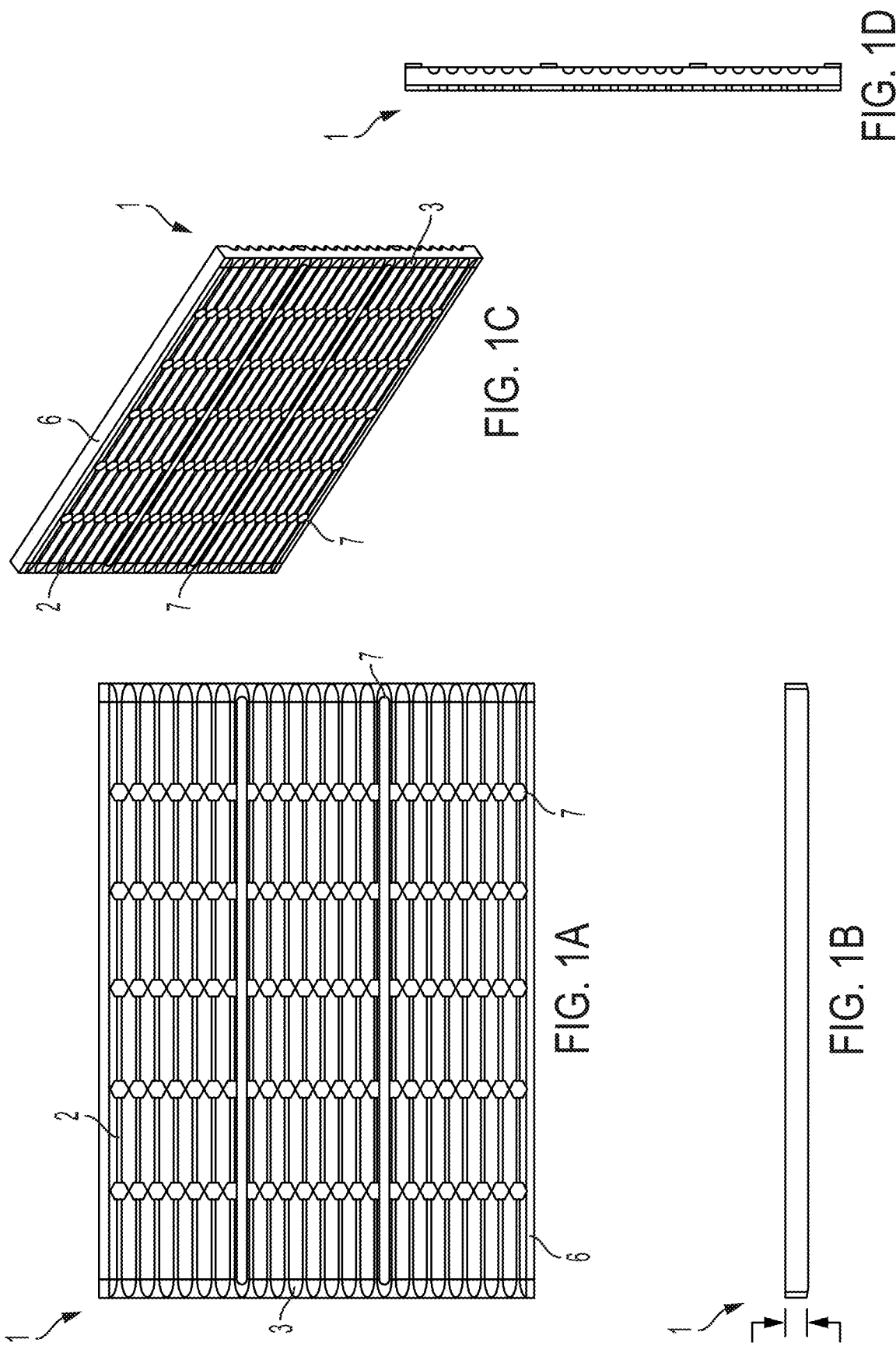
FIGS. 1a-1d show top, first side, bottom perspective, and second side views of the raft of the present disclosure.
Figure 2:
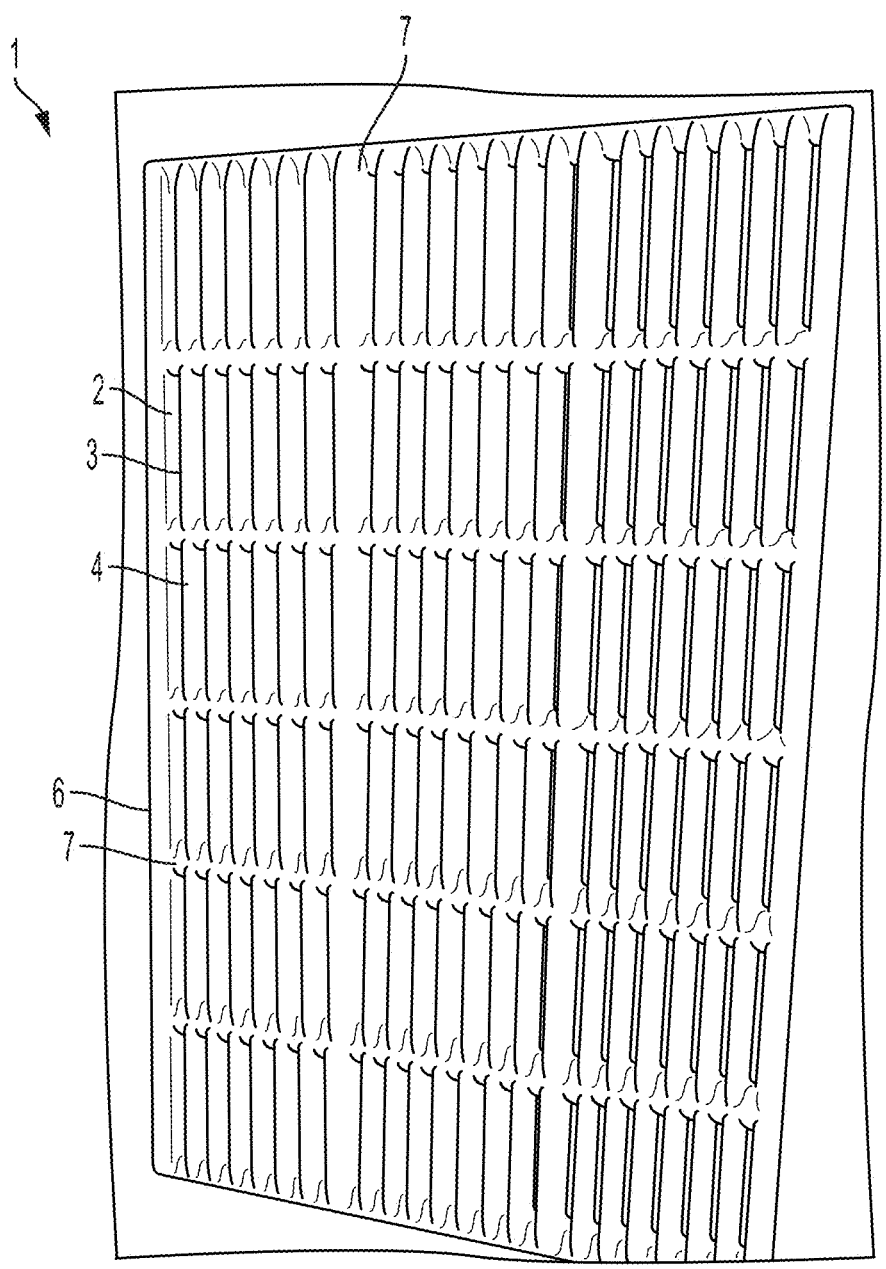
FIG. 2 shows a second top view of the raft of the present disclosure.
Figure 3:
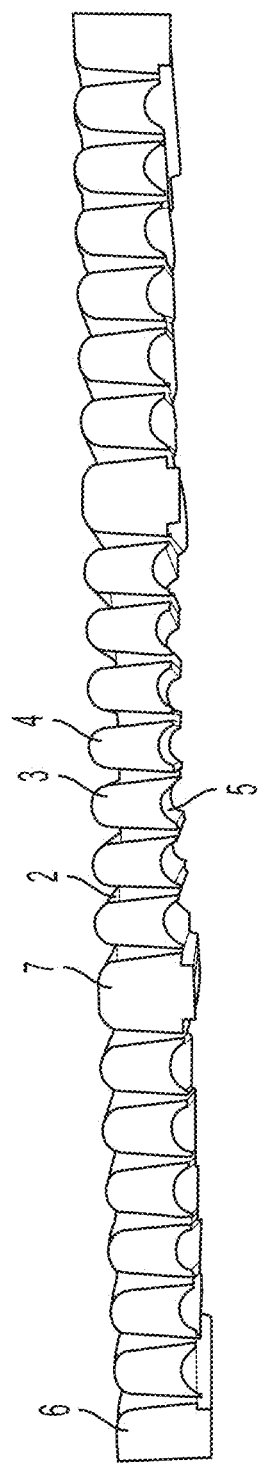
FIG. 3 is a side-cross-sectional view of the raft of the present disclosure.
Figure 4:
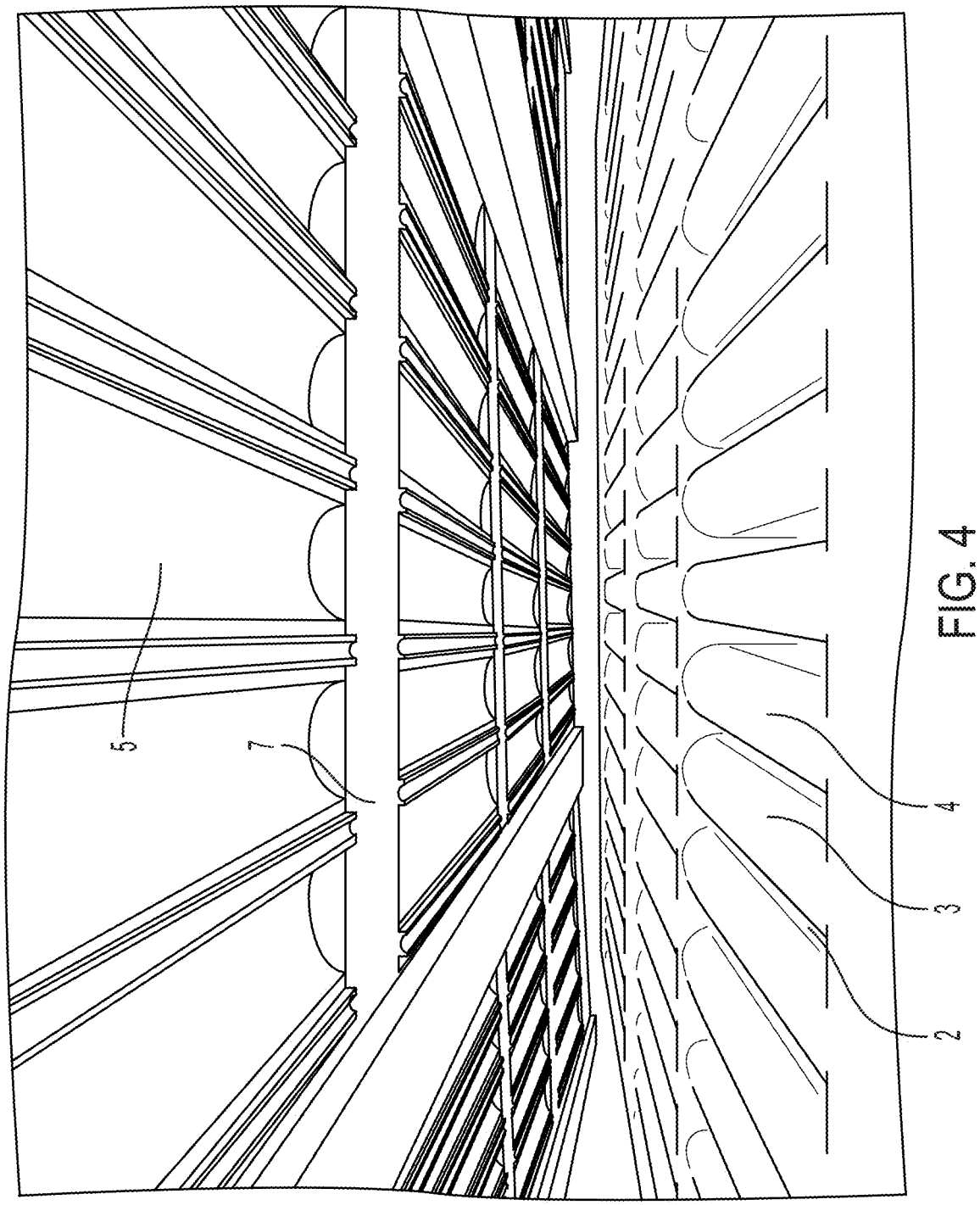
FIG. 4 shows two rafts of the present disclosure stacked on one another.
Figure 5A:
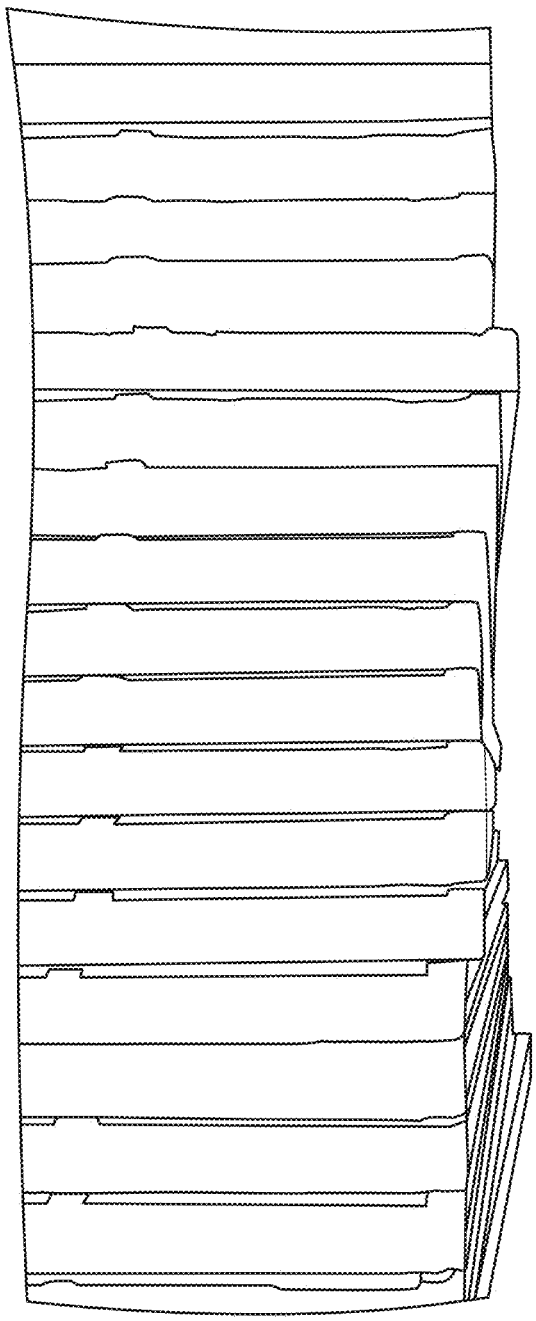
FIGS. 5*a* and 5*b* show first and second side views of stacked rafts of the present disclosure.
Figure 5B:
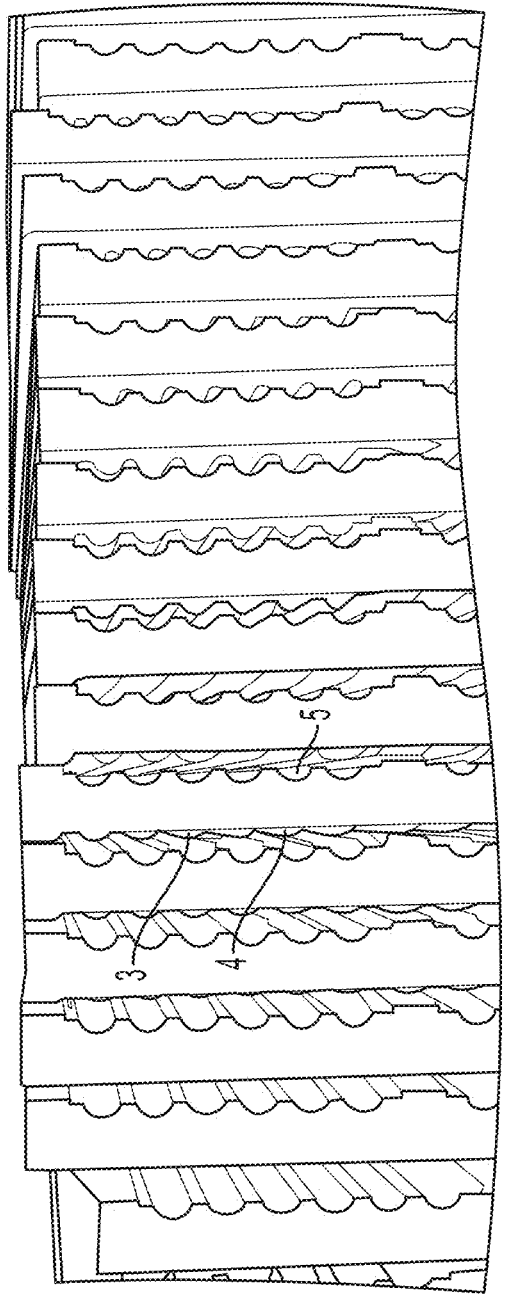

Referring to the Figures, raft 1 of the present disclosure is shown. Raft 1 can have a rectangular or square shape. Other shapes are contemplated, but rectangular and square shapes most efficiently cover the area (i.e., a water bath) where the rafts are typically used. As seen, there are a plurality of furrows 2 within raft 1, that are defined by a plurality of ribs 3. One or more, or preferably all of ribs 3 can have a rounded top edge 4 (FIG. 3), for example in the shown concave shape. When raft 1 is filled with media and crop seeds in the manner discussed below, rounded top end 4 of ribs 3 helps to ensure that the media and seeds fall into furrows 2, thus ensuring a high efficiency. In currently available raft designs that have flat surfaces between furrows or otherwise inadequate designs, the media and seeds do not always fall into the furrows, and are lost. Ribs 3 can have a shape that widens or tapers toward the bottom of raft 1, so that furrows 2 will be wider at the top and narrower at the bottom, in a general v-shape. This helps to prevent media and seeds from falling out of the bottom of raft 1.

Raft 1 of the present disclosure has several advantages over conventional rafts without the rounded top shape. The molds and process for making raft 1 are actually more expensive than making rafts with traditional squared off tops, since the geometry of the former is more complicated. However, with old boards, when the media and crop seed was deposited onto a raft, much of each would rest on top of the flat portion of the raft between furrows. This required that an operator manually move or shake the raft, to ensure that the media and crop seed would fall into the furrow. Without this manual adjustment, the media and crop seed that did not fall into the furrow would be lost. The manual adjustment step, however, adds significant time and labor costs to the growing costs.

With raft 1, most if not all of the media and crop seed falls into furrows 2. This provides a significant efficiency over currently available rafts, and also improved harvest times, which leads to a higher annual yield. The present inventors have found that on a weight per raft basis, the improved efficiency is from 5% to 20%, depending on the crop. For example, with a recent test of arugula crops, raft 1 provided an 8% improvement in yield over conventional, flat-topped rafts.

Raft 1 and/or ribs 3 can also have a curved underside 5, which may or may not generally conform to the shape of rounded top end 4. Curved underside 5 can be highly advantageous when multiple rafts 1 are in stacked alignment after the media and seeds have been deposited into furrows 2. Curved underside 5 can allow air to circulate between two stacked rafts 1. This air circulation can enhance the growth of the crops within furrows 2. This space also reduces the amount of seedlings that grow into the raft above them when stacked. It also allows more light to penetrate to the seedling and a more homogenous seeding climate across the stacked rafts.

In the present disclosure, the "top" of raft 1 is the side to which media and seeds are added. The "bottom" is the opposite side. Thus, rounded top end 4 curves away from the bottom of raft 1, as does curved underside 5. Furrows 2 are wider at the top of raft 1, and narrower at the bottom of raft 1. "Side" directions are those that are perpendicular to an axis that runs from the top to the bottom of raft 1.

Raft 1 can have an outer edge 6 and one or more intermediate braces 7, which run along a longitudinal axis of raft 1, and an axis perpendicular thereto. Braces 7 are similar to ribs 3, but are wider than ribs 3 along a side-to-side direction. Braces 7 can also have a rounded top end 8, and can also define furrows 2, either with additional braces 7 or one or more ribs 3. Braces 7 can provide additional mechanical stability to raft 1, for example to guard against the warping or bowing of raft 1.

Raft 1 can be made of any number of materials, such as plastics or any other material that is buoyant or can be made buoyant. Advantageous is a bead foam that can be compressed into a desired shape. One of these is a polystyrene foam such as Styrofoam®. The present disclosure has found that expanded polypropylene (EPP) is particularly suitable. Some of the benefits of EPP over expanded polystyrene (EPS) include that EPP has smaller beads, so when expanded it reduces the pores on raft 1. This in turn reduces biofilm build up over the life of raft 1 and increases the efficacy of cleaning agents and the ease of cleaning. Another advantage of EPP is its strength, as it is capable of handling more stress and therefore has a longer expected lifespan of up to 10× as compared to EPS boards. Another advantage to EPP is that it is recyclable, meaning that it is for the environment and less costly in waste removal from the user's facility.

The dimensions of raft 1 can be adjusted to the size of the user's facility. In the embodiment of FIGS. 1*a*-1*d*, there are one hundred thirty-two furrows 2. These are separated by a plurality of braces 7 into groupings of seven furrows 2 each, with one additional row of furrows 2 in the middle of raft 1. This embodiment is known as a "7-8-7" alignment, meaning that in a side to side direction, there are seven furrows 2 grouped together, a brace 7, eight furrows 2 grouped together in a middle section, a brace 7, and then seven more furrows 2 grouped together. Raft 1 can be scaled as needed. In many applications, the larger the raft the better. However, at large sizes mechanical stability and/or breakage becomes a concern. In one embodiment, raft 1 can be up to approximately two feet (twenty-four inches) by up to approximately three feet (thirty-six inches), or any subranges thereof. As previously discussed, raft 1 may also be square, for example approximately two feet by two feet or three feet by three feet. The height of raft 1 may be up to approximately two inches, or any subranges thereof.

Referring to FIGS. 6-9, a method 100 of filling raft 1 is shown. To fill raft 1 with media and crop seeds (not shown), raft 1 can be passed under hopper or feeder 110 with a conveyor 120. Conveyor 120 moves raft 1 in the direction shown. In some current designs, the furrows of the raft are aligned parallel to an axis of the hopper, which could be a drum seeder that may be in a linear orientation. When there is any problem or loss of synchronization between the raft and the drum seeder, for example with belt speed, calibration, or sensors, the seed drops onto the top surface of the raft (which was not rounded) and does not end up in a furrow. This is clearly a problem for seeding efficiency.

Figure 7:
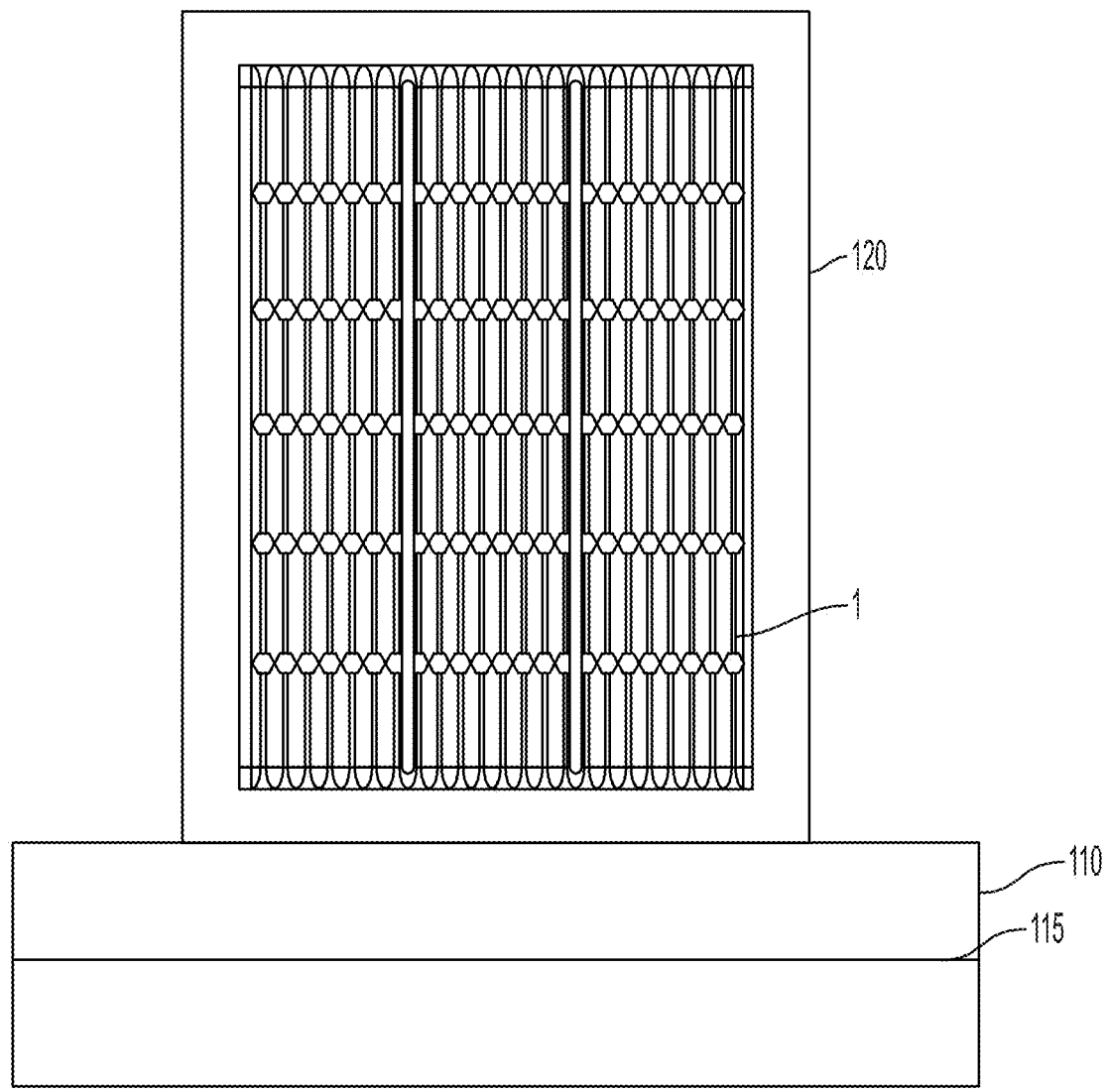
FIG. 7 is a top view of a hopper, raft, and conveyor from FIG. 6.

By contrast, in raft 1 of the present disclosure, furrows 2 are linear, and oriented on conveyor 120 so that they are perpendicular to an axis 115 of the hopper (drum seeder) 110. The growth media, seedlings, and/or topcoat are dispensed along axis 115 (FIG. 7). This ensures that regardless of where raft 1 is, media and seeds will fall directly into a furrow 2. For example, with prior devices, if a belt carrying a raft skipped and got out of sync with the seeder, seed might miss one or more furrows entirely. This is not the case with raft 1. Another advantage is with prior systems, one would need to purchase an individual custom drum for every density of seed placement desired. In raft 1, when the furrows 2 are perpendicular to the axis 115 of seeder 110, only drums with different bore sizes (i.e. hole size for seed size) are needed. The density can now be controlled by drum speed or belt speed, allowing up to as many as twenty-six densities per drum, instead of having to purchase twenty-six individual drums.

Raft 1 of the present disclosure also provides for a much more customizable and efficient application of media and seed as compared to currently available devices. Here, rounded top end 4 serves multiple purposes. If a seed is improperly placed, meaning that it does not fall into a furrow 2 right away, it will roll off top end 4 into a furrow 2 for high seeding accuracy. In addition, the rounded top end 4 lends itself to a topcoat application. In prior rafts, seeds were placed on top of media on a level plane, with no ability to alter where in the media the seed was placed. With raft 1, the depth of the seed can be adjusted. The amount of media in the original hopper fill can be reduced partially. The seed can be dropped into the partially media fill in furrows 2, and then another layer of media can be applied. Depending on the crop grown, the seed might be placed anywhere from 50% below the surface of the board, to directly on top of the media without a topcoat applied. This increases germination and yield and reduces the amount waste with current devices.

Figure 8:
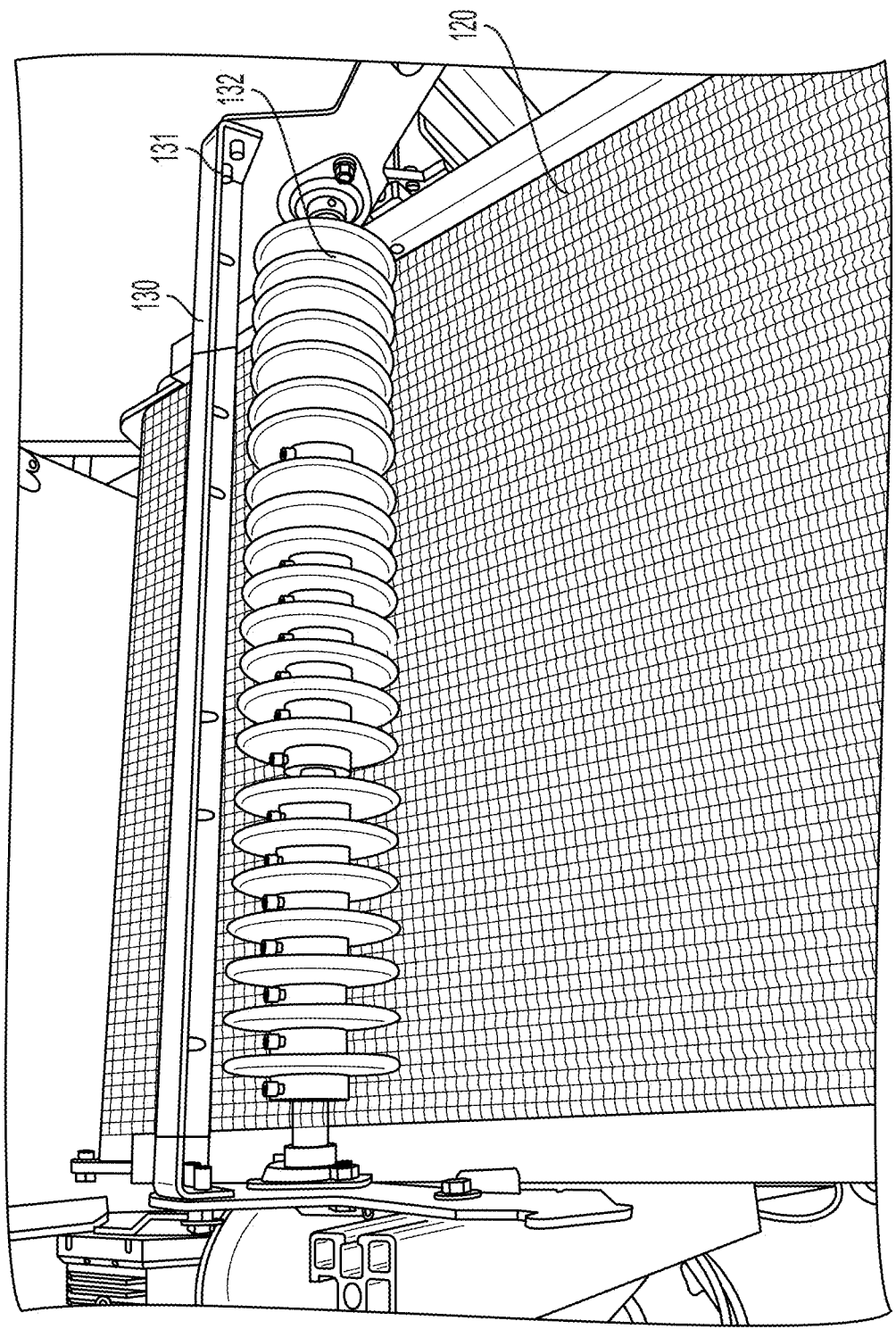
FIG. 8 is a perspective view of a dibbler used in the process of FIG. 6.
Figure 9:
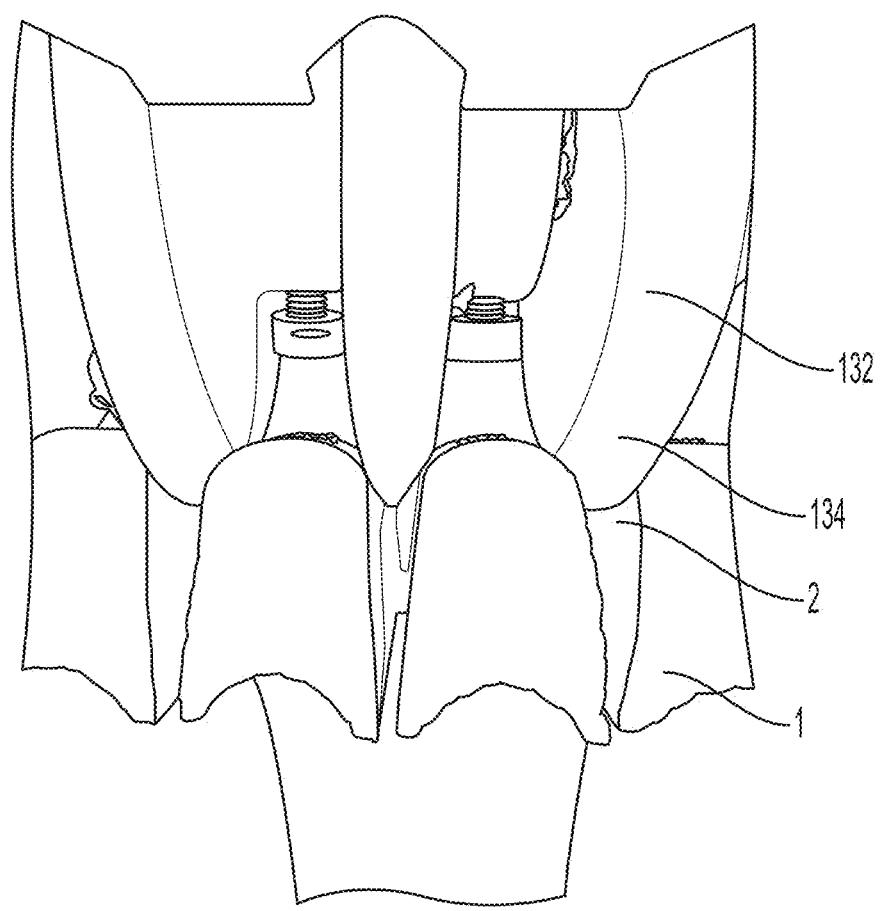
FIG. 9 is a close-up view of the dibbler of FIG. 8 inserted into a furrow in the raft of FIGS. 1*a*-1*d*.

Method 100 also includes a dibbler 130 (also spelled "dibber"). As seen in FIG. 8, dibbler 130 comprises a frame 131 with a linear array of wheels 132 connected thereto. Each of wheels 132 has a tapered lower end 134. Lower ends 134 are tapered so that they generally conform to the shape of furrow 2, namely a v-shape. This is so that after media is loaded into furrows 2 via hopper 110, tray 1 can pass under dibbler 130 (FIG. 6), where wheels 132 compact the media in furrows 2, or push seedlings to a lower depth in furrow 2.

Each of wheels 132 can be tailored or modified so that it can penetrate furrows 2 up to a desired depth. Dibbler 130 can have a number of wheels 132 that conforms to the number and arrangement of furrows 2 in raft 1. For example, in the shown embodiment, Dibbler 130 has wheels 132 in a 7-8-7 configuration to match the number of furrows 2 described above. In one embodiment, wheels 132 can have a diameter that is four inches or less, or any subranges thereof. A thickness of wheels 132 can be 0.5 inches or less, or any subranges thereof. Lower ends 134 can taper from the thickness of 0.5 inches or less down to a point of 0.1 inches or less. The length of the taper can be 0.5 inches or less. Furrows 2 are dimensioned so that they can fit or accommodate the full thickness of wheel 132 (i.e. up to 0.5 inches) at the top of furrow 2, or so that the top of furrow 2 is only wide enough to fit wheel 132 at a tapered portion thereof.

Figure 10A:
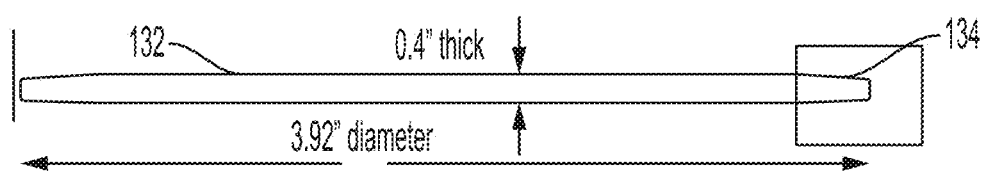
FIG. 10*a* is a schematic drawing of a wheel of the dibbler of FIG. 8.
Figure 10B:
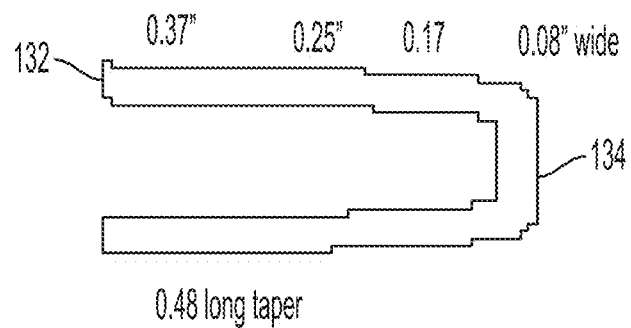
FIG. 10*b* is an enlarged view of an area of the drawing of FIG. 10*a*.

FIGS. 10a and 10b illustrate one embodiment of dibbler wheel 132. The dimensions in FIGS. 10a and 10b are illustrative examples of the dimensions described above, and are not limiting. As can be seen in FIG. 10b, lower ends 134 can taper from a first thickness, which is the diameter of wheel 132 (shown as 0.4 inches), to a second thickness (0.37), a third thickness (0.25), a fourth thickness (0.17), and the fifth or final thickness (0.08) at the tip of wheel 132. The taper can be sloped or stepped. In addition, the taper of lower end 134 can have a uniform pitch throughout, or can be steeper in some areas than others.

Method 100 may also include a second hopper or feeder 140, or more hoppers or feeders. Each of feeders 110 and 140 can dispense different portions or parts of the material that ends up in furrows 2. For example, in the shown embodiment, hopper 110 can dispense growing media, and hopper 140 can dispense seedlings. A third hopper (not shown) may dispense a topcoat. Alternatively, hopper 110 can dispense the growing media and seedlings, and hopper 140 a topcoat. Further, dibbler 130 can be used at any point in process 100. In a preferred embodiment, raft 1 passes under dibbler 130 after furrows 2 have been filled with growth media and seedlings.

While the present disclosure has been described with reference to one or more particular embodiments, it will be understood by those skilled in the art that various changes may be made, and equivalents may be substituted for elements thereof without departing from the scope thereof. In addition, many modifications may be made to adapt a particular situation or material to the teachings of the disclosure without departing from the scope thereof. Therefore, it is intended that the disclosure is not limited to the particular embodiment(s) disclosed as the best mode contemplated for carrying out this disclosure.

What is claimed is:

1. A raft for growing crops hydroponically, comprising:
a rectangular frame;
a plurality of ribs within and connected to the rectangular frame; and
a plurality of furrows, wherein each of the plurality of furrows is defined by the plurality of ribs, so that each furrow is between a pair of the plurality of ribs,
wherein each of the plurality of ribs has a top surface, wherein the top surface has no flat portion,
wherein each of the plurality of ribs has a width that increases in a direction from the top surface to a bottom surface of the ribs, so that each of the plurality of furrows is narrower at the bottom end than at the top end, wherein each of the ribs has a concave surface on an underside thereof, and
wherein the raft is made of a material that consists of expanded polypropylene.

2. The raft of claim 1, wherein at least a portion of the top surface is curved.

3. The raft of claim 1, wherein each of the furrows are substantially linear, and are in substantially parallel alignment with one another.

4. The raft of claim 1, wherein at least one of the plurality of ribs is wider than the remaining ribs.

5. The raft of claim 1, wherein the raft has a length that is 0.9144 meters (three feet) or less.

6. The raft of claim 1, wherein the raft has a width that is 0.6096 meters (two feet) or less.

7. The raft of claim 1, wherein the raft has a height that is 5.08 centimeters (two inches) or less.

8. The raft of claim 1, wherein two of the ribs are thicker than the remaining ribs, so that the plurality of furrows is divided into three sections, and there are seven furrows in a first of the sections, eight furrows in a second of the sections, and seven furrows in a third of the sections.

9. A raft for growing crops hydroponically, comprising:
a rectangular frame;
a plurality of ribs within and connected to the rectangular frame; and
a plurality of furrows, wherein each of the plurality of furrows is defined by the plurality of ribs, so that each furrow is between a pair of adjacent ribs,
wherein each of the furrows are substantially linear, and are in substantially parallel alignment with one another, and
wherein each of the plurality of ribs has a top surface, wherein the top surface has no flat portion,
wherein each of the plurality of ribs has a width that increases in a direction from the top surface to a bottom surface of the ribs, so that each of the plurality of furrows is narrower at the bottom end than at the top end, wherein each of the ribs has a concave surface on an underside thereof, and
wherein the raft is made of a material that consists of expanded polypropylene.

10. The raft of claim 9, further comprising at least one cross-brace along a longitudinal axis of the raft and at least one cross-brace along a second axis perpendicular to the longitudinal axis, wherein the cross-braces each have a width that is greater than a width of the plurality of ribs.

11. An assembly for growing crops hydroponically, comprising:
a raft, wherein the raft comprises a rectangular frame, a plurality of ribs within and connected to the rectangular frame, and a plurality of furrows, wherein each of the plurality of furrows is defined by the plurality of ribs, so that each furrow is between a pair of adjacent ribs,
wherein each of the plurality of ribs has a top surface, wherein the top surface has no flat portion, wherein each of the plurality of ribs has a width that increases in a direction from the top surface to a bottom surface of the ribs, so that each of the plurality of furrows is narrower at the bottom end than at the top end, wherein each of the ribs has a concave surface on an underside thereof, and wherein the raft is made of a material that consists of expanded polypropylene;
a conveyor, wherein the conveyor moves the raft in a first direction that is parallel to an orientation of the plurality of ribs;
a hopper above the conveyor, wherein the hopper disburses growing media and/or crop seeds into the furrow, wherein the hopper disburses the growing media and/or crop seeds along a second direction, wherein the second direction is substantially perpendicular to the first direction; and
optionally, a dibbler above the conveyor, wherein the dibbler comprises a plurality of dibbler wheels, wherein one of the dibbler wheels projects at least partially into an associated furrow, to compact the growing media and/or crop seeds therein.

12. The raft of claim 1, wherein the raft further comprises a frame surrounding the plurality of ribs and the plurality of furrows, and wherein there are no flat portions within the frame.

13. The raft of claim 9, wherein there are no flat portions within the frame.

14. The raft of claim 1, wherein the top surface of each of the plurality of ribs is rounded.

* * * * *